United States Patent
Yip et al.

(10) Patent No.: US 7,472,264 B2
(45) Date of Patent: Dec. 30, 2008

(54) PREDICTING A JUMP TARGET BASED ON A PROGRAM COUNTER AND STATE INFORMATION FOR A PROCESS

(75) Inventors: Edmond H. Yip, San Francisco, CA (US); Paul Caprioli, Mountain View, CA (US); Shailender Chaudhry, San Francisco, CA (US); Jiejun Lu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 71 days.

(21) Appl. No.: 11/479,890

(22) Filed: Jun. 30, 2006

(65) Prior Publication Data
US 2008/0005545 A1    Jan. 3, 2008

(51) Int. Cl.
*G06F 9/42* (2006.01)
(52) U.S. Cl. .................................. 712/240; 712/239
(58) Field of Classification Search ............. None
See application file for complete search history.

(56) References Cited

U.S. PATENT DOCUMENTS

| | | | | |
|---|---|---|---|---|
| 5,283,873 | A * | 2/1994 | Steely et al. | 712/207 |
| 5,454,087 | A * | 9/1995 | Narita et al. | 712/240 |
| 6,021,489 | A * | 2/2000 | Poplingher | 712/239 |
| 6,115,810 | A * | 9/2000 | Patel et al. | 712/239 |
| 6,553,488 | B2 * | 4/2003 | Yeh et al. | 712/239 |

* cited by examiner

*Primary Examiner*—Kenneth S Kim
(74) *Attorney, Agent, or Firm*—Park, Vaughan & Fleming LLP

(57) ABSTRACT

One embodiment of the present invention provides a system that predicts a jump target for a jump instruction. During operation, the system starts fetching the jump instruction while executing a process. Next, the system uses a program counter for the process and uses state information that is specific to the process to look up the jump target for the jump instruction. Finally, the system uses the jump target returned by the lookup as a predicted jump target for the jump instruction.

25 Claims, 4 Drawing Sheets

PREDICTING A JUMP TARGET BASED ON A PROGRAM COUNTER AND STATE INFORMATION FOR A PROCESS

BACKGROUND

1. Field of the Invention

The present invention relates to techniques for improving computer system performance. More specifically, the present invention relates to the design of a high-speed jump-target predictor, which can be dynamically shared between processes.

2. Related Art

Advances in semiconductor fabrication technology have given rise to dramatic increases in processor clock speeds. These increasing clock speeds have significantly increased processor performance. However, as clocks speeds continue to increase, the time available to perform computational operations within each pipeline stage decreases. This causes some computational operations to require more pipeline stages, which can reduce the performance improvements gained by increasing the clock speed.

For example, as clock speeds continue to increase, it is becoming progressively harder to perform jump instructions without introducing additional pipeline stages. More specifically, a typical jump instruction causes a control transfer to a "jump target," but the jump target is not actually calculated until the after the source registers of the jump instruction are read. This means the instruction fetch unit (IFU) has to wait to fetch the next instruction until the source registers are read and jump target is calculated. Hence, in order to avoid waiting for a jump target to be calculated, it is desirable for the IFU to be able to predict jump targets.

Some existing systems use a per-process return address stack to predict jump targets for jumps that are used to return from subroutines. Unfortunately, this type of stack cannot be shared between processes because accesses from different processes would interfere with each other. Consequently, in this type of system each process requires its own stack, which can consume a large amount of semiconductor area and can greatly increase system complexity. (The term "process" as used in this specification and the associated claims refers to any thread of execution that maintains its own program counter. Note that processes are also referred to as "threads" or "strands.") For subroutine calls and other types of jump instructions, a program-counter-indexed target buffer is often used to predict jump targets.

Hence, what is needed is a method and an apparatus for predicting jump targets without the above-described problems.

SUMMARY

One embodiment of the present invention provides a system that predicts a jump target for a jump instruction. During operation, the system starts fetching the jump instruction while executing a process. Next, the system uses a program counter for the process along with process state information to look up the jump target for the jump instruction. Finally, the system uses the jump target returned by the lookup as a predicted jump target for the jump instruction.

In a variation on this embodiment, if the jump instruction is used to return from a program-method, the system looks up the jump target by: using the process state information to form an index; using the index to lookup the jump target in a return-target-buffer; and modifying the process state information to reverse a modification made during a preceding jump instruction which called the program-method.

In a further variation, if the jump instruction is used to call a program-method, the system looks up the jump target by: using the program counter to lookup the jump target in a jump-target-buffer; and modifying the process state information so that the process state information is different the next time the program-method is called, and so that the modification can be reversed by a corresponding return instruction.

In a further variation, if the jump instruction does not implement a call or a return, the system looks up the jump target by using the program counter to lookup the jump target in the jump-target-buffer.

In a further variation, the lookup in the jump-target-buffer and the lookup in the return-target-buffer take place in parallel. In this variation, the system selects between results obtained from the jump-target-buffer and the return-target-buffer by using the program counter to perform a lookup into a jump-type-prediction-buffer which stores predictions for jump types.

In a further variation, the jump-target-buffer, the return-target-buffer and the jump-type-prediction-buffer are shared by multiple processes.

In a further variation, after the actual jump type is determined by examining the jump instruction, and the system stores the actual jump type in the jump-type-prediction-buffer.

In a further variation, after the actual jump target is resolved, the system stores the actual jump target into either the jump-target-buffer or the return-target-buffer.

In a further variation, the return-target-buffer and the jump-target-buffer are both stored in a unified dual-ported lookup structure.

In a further variation, if the jump instruction is used to implement a call, modifying the process state information involves exclusive-ORing the process state information with the address of an instruction following the call instruction and performing a rotation on the result. Similarly, if the jump instruction is used to implement a return, modifying the process state information involves performing a reverse-rotation on the process state information and exclusive-ORing the result with a predicted jump target for the return instruction.

In a variation on this embodiment, the system is part of an instruction fetch unit (IFU) of a processor.

In a variation on this embodiment, the process state information is stored in a return-history-register.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Processor

Figure 1:
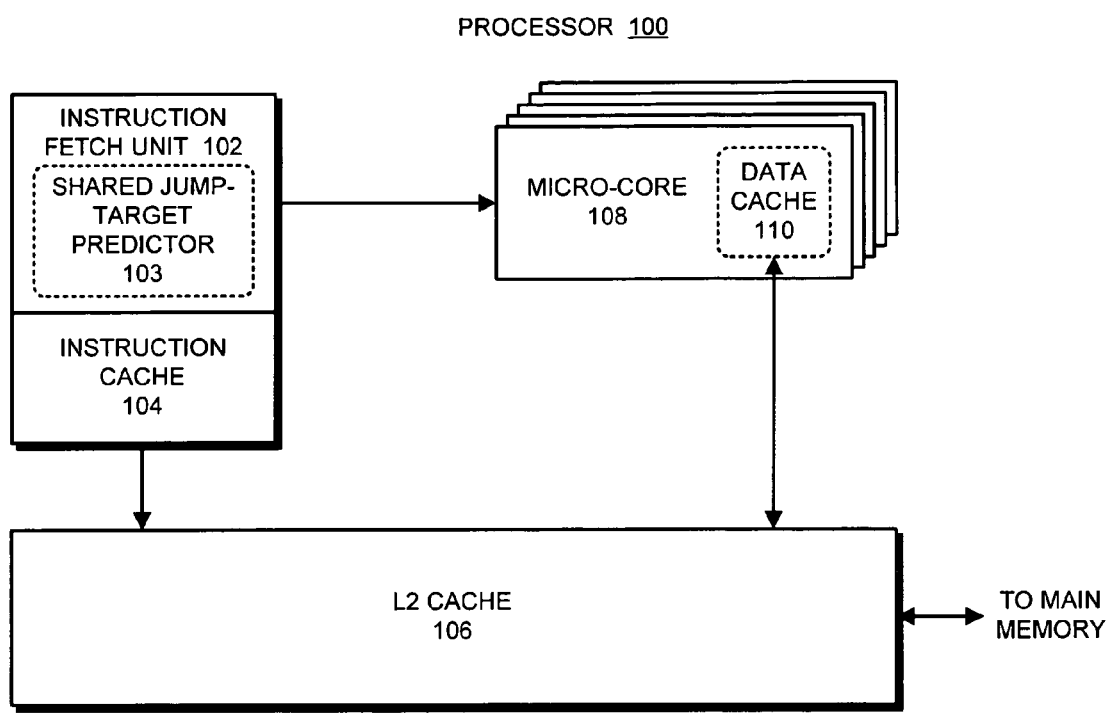
FIG. 1 illustrates a processor in accordance with an embodiment of the present invention.

FIG. 1 illustrates a processor 100 in accordance with an embodiment of the present invention. Processor 100 can generally include any type of processor, including, but not limited to, a microprocessor, a processor within a mainframe computer, a digital signal processor, a processor within a portable computing device, a device controller, or a computational engine within an appliance.

As illustrated in FIG. 1, processor 100 includes an instruction fetch unit (IFU) 102, which includes circuitry that implements a shared jump-target predictor 103. This circuitry is described in more detail below with reference to FIGS. 2-4.

During operation, IFU 102 fetches instructions from instruction cache 104 and feeds the instructions into a number of micro-cores, including micro-core 108. Each of these micro-cores includes computational circuitry and is associated with a data cache, such as data cache 110.

Instruction cache 104 and data cache 110 are used to store cache lines obtained from Level Two (L2) cache 106. L2 cache is coupled to a main memory (not shown). Although the present invention is described with reference to the specific processor architecture illustrated in FIG. 1, the present invention is not meant to be limited this processor architecture. In general, the present invention can be applied to any processor architecture that predicts jump targets.

Prediction Circuitry

Figure 2:
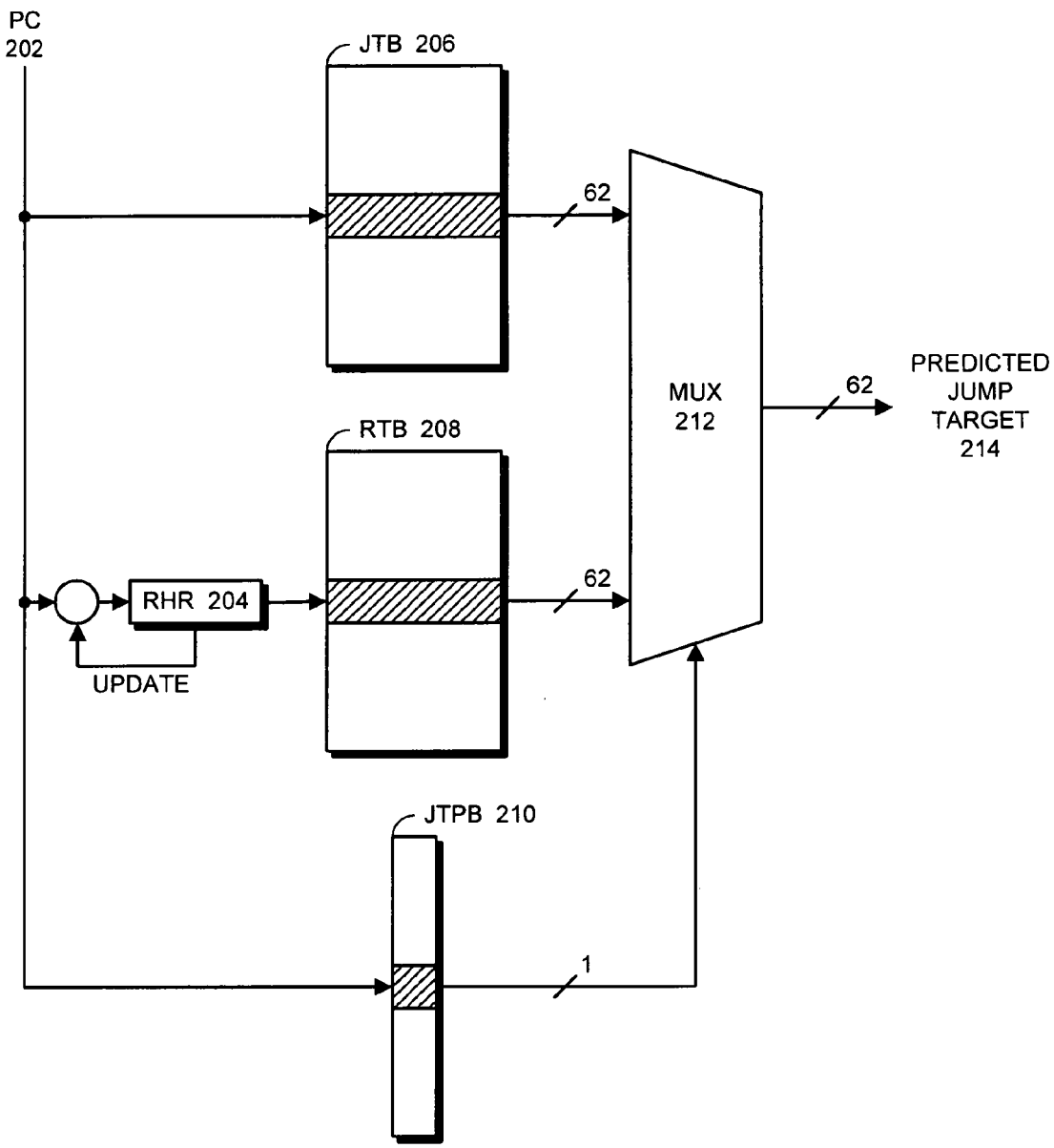
FIG. 2 illustrates circuitry that implements a shared jump-target predictor in accordance with an embodiment of the present invention.

FIG. 2 illustrates circuitry that implements a shared jump-target predictor 103 in accordance with an embodiment of the present invention. This circuitry includes: jump-target-buffer (JTB) 206, return-target buffer (RTB) 208, jump-type-prediction-buffer (JTPB) 210, return-history-register (RHR) 204 and multiplexer (MUX) 212.

In general, jumps are classified into three categories: (1) calls to subroutines; (2) returns from subroutines; and (3) other jumps (e.g., jumps for programming language "case" statements). In the embodiment of the present invention illustrated in FIG. 2, jump-target predictions for categories (1) and (3) are stored in JTB 206, whereas jump-target predictions for category (2) are stored in RTB 208. Note that JTB 206 and RTB 208 can both be stored in a single unified dual-ported lookup structure.

During system operation, JTB 206 is indexed by a program counter (PC) 202 and the resulting jump-target prediction feeds into an input of MUX 212.

At the same time, RHR 204 is used to produce an index which is used to lookup a jump-target prediction from RTB 208. This jump-target prediction from RTB 208 feeds into another input of MUX 212. (Note that the number of bits in RHR 204 can be larger than the number of bits needed to index RTB 208.)

A separate RHR is maintained for each process in the system, and this RHR is updated using PC 202 during each subroutine call or subroutine return which is executed by the process. This updating operation is described in more detail below with reference to FIG. 4. Additionally, copies of each RHR can be maintained at different locations in the processor. For example, in one embodiment of the present invention, a copy of each RHR is maintained: (1) in IFU 102 to facilitate jump target prediction; (2) in an execution unit within a micro-core to update the corresponding copy of the RHR in IFU 102 after a mis-predict (including a branch mis-predict); (3) in a downstream trap unit to update corresponding copies of the RHR in IFU 102 and in micro-core 108; and (4) in a downstream trap unit when a checkpoint is taken to facilitate speculative execution.

While the lookups in JTB 206 and RTB 208 are taking place, PC 202 is used to lookup a "jump-type prediction" from JTPB 210. The result of this lookup is a single bit which indicates whether the jump type is category (1) or (3), in which case the output of JTB 206 should be selected, or the jump type is category (2), in which case the output of RTB 208 should be selected.

The output of MUX 212 produces the predicted jump target 214.

Pipeline State Diagram

Figure 3:
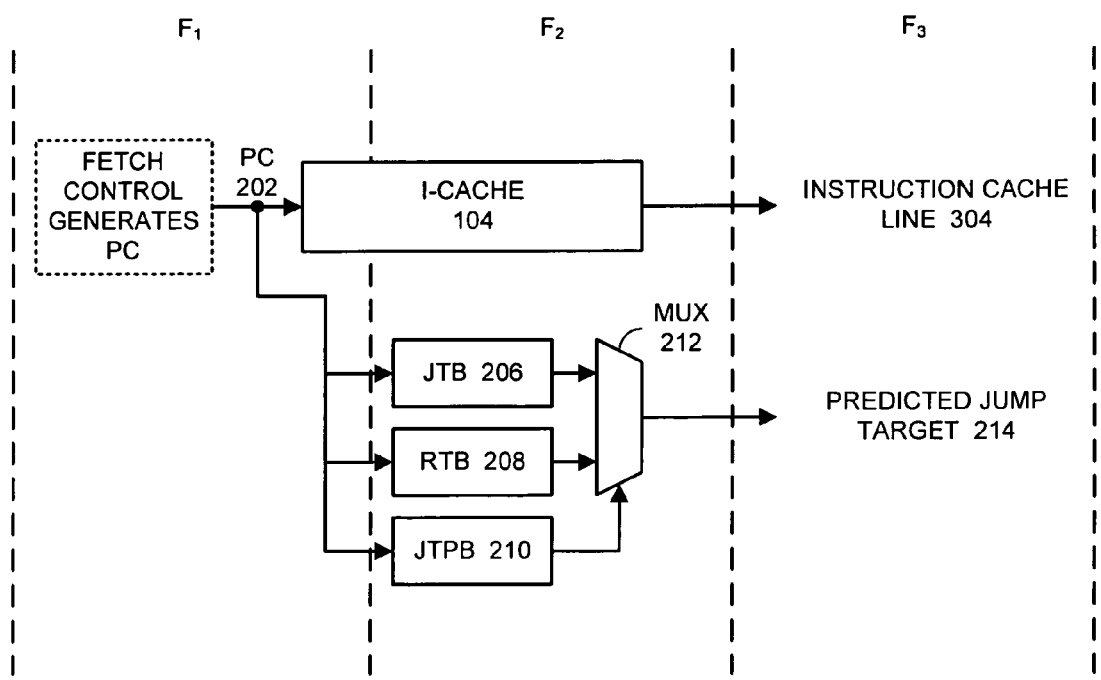
FIG. 3 presents a pipeline-stage diagram showing instruction-fetch stages in accordance with an embodiment of the present invention.

FIG. 3 presents a pipeline-stage diagram showing several instruction-fetch stages in accordance with an embodiment of the present invention. This diagram illustrates three pipeline stages F1, F2 and F3.

During F1, fetch control circuitry within IFU 102 generates PC 202. PC 202 feeds into instruction cache 104 to start fetching a cache line containing a block of instructions. At the same time PC 202 feeds into JTB 206, RTB 208 and JTPB 210. In stage F2, the instruction cache fetch operation and the lookups into JTB 206, RTB 208 and JTPB 210 are in progress.

Finally, at stage F3, an instruction cache line 304 and predicted jump target 214 become available. The predicted jump target 214 can then be used to start fetching the next cache line without having to wait for the actual jump target to be resolved. Note that when the jump target is actually resolved, if the predicted jump target is not correct, IFU 102 initiates another fetch from the correct jump target.

Jump-Target Prediction Process

Figure 4:
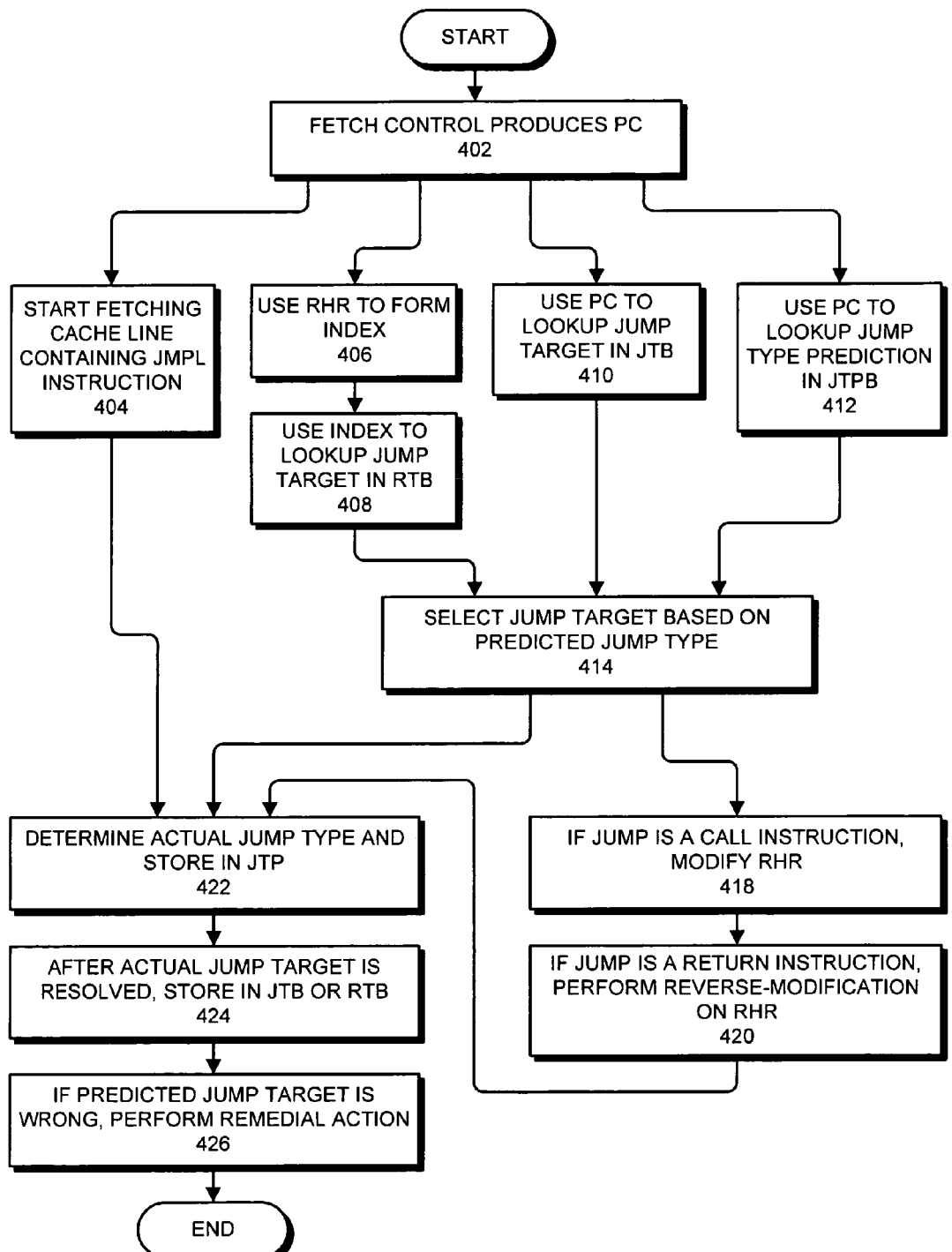
FIG. 4 presents a flow chart illustrating the jump-target prediction process in accordance with an embodiment of the present invention.

FIG. 4 presents a flow chart illustrating the jump-target prediction process in accordance with an embodiment of the present invention. This process starts when fetch control circuitry within IFU 102 produces PC 202 (step 402).

Next, a number of operations take place in parallel. The system starts fetching a cache line containing the jump instruction from instruction cache 104 (step 404). (Note that in one embodiment of the present invention the jump instruction is a jump-and-link (JMPL) instruction defined within the Sparc™ instruction set, developed by SUN Microsystems, Inc. of Sunnyvale, Calif.)

At the same time, PC 202 is used to perform a lookup into JTB 206 (step 410).

At the same time, RHR 204 is used to form an index (step 406), which is used to perform a lookup into RTB 208 (step 408).

At the same time, PC 202 is also used to perform a lookup into JTPB 210 (step 412) and the result of this lookup is used to select between the outputs of JTB 206 and RTB 208 to select a predicted jump target 214 (step 414).

Additionally, if the jump instruction is used to implement a call, the system modifies RHR 204 so that the process state information is not the same the next time the subroutine is called, and so that the modification can be reversed by a corresponding return (step 418). Furthermore, PC+8 is installed into RTB 208 at an index generated using the modified RHR 204. On the other hand, if the jump instruction is used to implement a return, the system modifies the RHR 204 to reverse the modification made during the call (step 420).

For example, in one embodiment of the present invention, the system performs the following operations on RHR 204 during a call:

RHR :=RHR XOR (PC+8);
    rotate_right(RHR); and
    put PC+8 into RTB at index generated using rotated RHR, wherein XOR is an exclusive-OR operation, and PC+8 is the address of the instruction following the call instruction and an associated delay-slot instruction.

Similarly, during a return, the system performs the following operations on RHR 204:

obtain prediction from RTB using index generated using RHR;
    rotate_left(RHR); and
    RHR :=RHR XOR prediction, wherein "prediction" is the predicted jump target for the return instruction. Note that the operations performed during the return reverse the operations performed during the call.

Next, when the cache line containing the instructions is fetched, the system determines the actual jump type and uses this information to update a corresponding bit into JTPB 210 (step 422). (In an alternative embodiment, JTPB 210 is only updated if the jump type is mis-predicted.) Note that the jump type can be determined by examining the jump instruction. For example, in the Sparc™ instruction set, a JMPL instruction records the current program counter to a destination register. Because a subroutine call instruction always loads the PC to a specific register, a subroutine call can be identified by looking for the specific register in the destination field of the JMPL instruction.

Similarly, after the actual jump target is resolved for category (1) and category (3) jumps (but not category (2) jumps), the system stores this actual jump target into JTB 206 (step 424). (In an alternative embodiment, JTB 206 is only updated when the jump-target is mis-predicted.)

Also, if the predicted jump target does not match the actual jump target, the system performs a remedial action, which can involve commencing a fetch operation for the actual jump target (step 426).

In one embodiment of the present invention, a single jump target is predicted for each instruction cache line. Note that although there may be more than one jump instruction in the cache line, the first jump instruction which is encountered in the cache line will likely cause the flow of execution to leave the cache line. Hence, only one jump target needs to be predicted for each instruction cache line.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for predicting a jump target for a jump instruction, comprising:
    fetching the jump instruction while executing a process; and
    looking up the jump target for the jump instruction based on a program counter for the process and on process state information, wherein a process state information includes a separate return history register (RHR) maintained for a respective process; and
    designating the jump target returned by the lookup as a predicted jump target for the jump instruction.

2. The method of claim 1, wherein if the jump instruction corresponds to a return from a program-method, looking up the jump target involves:
    forming an index based on the process state information;
    looking up the jump target in a return-target-buffer based on the index; and
    modifying the process state information to reverse a modification made during a preceding jump instruction which called the program-method.

3. The method of claim 2, wherein if the jump instruction corresponds to a call to a program-method, looking up the jump target involves:
    looking up the jump target in a jump-target-buffer based on the program counter; and
    modifying the process state information so that the process state information is not the same the next time the program-method is called, and so that the modification can be reversed by a corresponding return.

4. The method of claim 3, wherein if the jump instruction does not implement a call or a return, looking up the jump target involves looking up the jump target in the jump-target-buffer based on the program counter.

5. The method of claim 4,
    wherein the lookup in the jump-target-buffer and the lookup in the return-target-buffer take place in parallel; and
    wherein the method further comprising selecting between results obtained from the jump-target-buffer and the return-target-buffer by looking into a jump-type-prediction-buffer based on the program counter, wherein the jump-type-prediction-buffer stores predictions for jump types.

6. The method of claim 5, wherein the jump-target-buffer, the return-target-buffer and the jump-type-prediction-buffer are shared by multiple processes.

7. The method of claim 5, wherein after the actual jump type is determined by examining the jump instruction, the method farther comprises storing the actual jump type in the jump-type-prediction-buffer.

8. The method of claim 4, wherein after the actual jump target is resolved, the method further comprises storing the actual jump target into either the jump-target-buffer or the return-target-buffer.

9. The method of claim 4, wherein the return-target-buffer and the jump-target-buffer are both stored in a unified dual-ported lookup structure.

10. The method of claim 3,
    wherein if the jump instruction implements a call, modifying the process state information involves exclusive-ORing the process state information with the address of an instruction following the call and performing a rotation on the result; and
    wherein if the jump instruction implements a return, modifying the process state information involves performing a reverse-rotation on the process state information and exclusive-ORing the result with a predicted jump target for the return.

11. The method of claim 1, wherein the method takes place within an instruction fetch unit (IFU) of a processor.

12. The method of claim 1, wherein the process state information is stored in a return-history-register.

13. An apparatus that predicts a jump target for a jump instruction, comprising:
    a fetching mechanism configured to fetch the jump instruction while executing a process; and a jump-target-prediction mechanism configured to,
look up the jump target for the jump instruction based on a program counter for the process and on process state information, wherein a process state information includes a separate return history register (RHR) maintained for a respective process, and to
designate the jump target returned by the lookup as a predicted jump target for the jump instruction.

14. The apparatus of claim 13, wherein if the jump instruction corresponds to a return from a program-method, while looking up the jump target, the jump-target-prediction mechanism is configured to:
form an index based on the process state information;
look up the jump target in a return-target-buffer based on the index; and to
modify the process state information to reverse a modification made during a preceding jump instruction which called the program-method.

15. The apparatus of claim 14, wherein if the jump instruction corresponds to a call a to a program-method, while looking up the jump target, the jump-target-prediction mechanism is configured to:
look up the jump target in a jump-target-buffer based on the program counter; and to
modify the process state information so that the process state information is not the same the next time the program-method is called, and so that the modification can be reversed by a corresponding return.

16. The apparatus of claim 15, wherein if the jump instruction does not implement a call or a return, while looking up the jump target, the jump-target-prediction mechanism is configured to look up the jump target in the jump-target-buffer based on the program counter.

17. The apparatus of claim 16,
wherein the lookup in the jump-target-buffer and the lookup in the return-target-buffer take place in parallel; and
wherein the apparatus further comprising a selection mechanism configured to select between results obtained from the jump-target-buffer and the return-target-buffer by looking into a jump-type-prediction-buffer based on the program counter, wherein the jump-type-prediction-buffer stores predictions for jump types.

18. The apparatus of claim 17, wherein the jump-target-buffer, the return-target-buffer and the jump-type-prediction-buffer are configured to be shared by multiple processes.

19. The apparatus of claim 17, wherein after the actual jump type is determined by examining the jump instruction, the jump-target-prediction mechanism in configured to store the actual jump type in the jump-type-prediction-buffer.

20. The apparatus of claim 16, wherein after the actual jump target is resolved, the jump-target-prediction mechanism is configured to store the actual jump target into either the jump-target-buffer or the return-target-buffer.

21. The apparatus of claim 16, wherein the return-target-buffer and the jump-target-buffer are contained within a unified dual-ported lookup structure.

22. The apparatus of claim 15,
wherein if the jump instruction implements a call, while modifying the process state information, the jump-target-prediction mechanism is configured to exclusive-OR the process state information with the address of an instruction following the call and to perform a rotation on the result; and
wherein if the jump instruction implements a return, while modifying the process state information, the jump-target-prediction mechanism is configured to perform a reverse-rotation on the process state information and to exclusive-OR the result with a predicted jump target for the return.

23. The apparatus of claim 13, wherein the apparatus is part of an instruction fetch unit (IFU) of a processor.

24. The apparatus of claim 13, wherein the process state information is stored in a return-history-register.

25. A computer system that predicts a jump target for a jump instruction, comprising:
a processor;
a memory coupled to the processor;
an instruction-fetch-unit within the processor configured to fetch a block of instructions containing the jump instruction while executing a process; and
a jump-target-prediction mechanism within the instruction-fetch-unit which is configured to,
look up the jump target for the jump instruction based on a program counter for the process and on process state information, wherein a process state information includes a separate return history register (RHR) maintained for a respective process, and to
designate the jump target returned by the lookup as a predicted jump target for the jump instruction.

* * * * *

UNITED STATES PATENT AND TRADEMARK OFFICE
CERTIFICATE OF CORRECTION

PATENT NO.         : 7,472,264 B2
APPLICATION NO.    : 11/479890
DATED              : December 30, 2008
INVENTOR(S)        : Edmond H. Yip et al.

Page 1 of 1

It is certified that error appears in the above-identified patent and that said Letters Patent is hereby corrected as shown below:

In claim 7 (column 6, line 40), please change the word "farther" to the word --further--.

Signed and Sealed this

Tenth Day of February, 2009

JOHN DOLL
*Acting Director of the United States Patent and Trademark Office*